US006813639B2

(12) United States Patent
Nobakht et al.

(10) Patent No.: US 6,813,639 B2
(45) Date of Patent: Nov. 2, 2004

(54) METHOD FOR ESTABLISHING CHANNEL-BASED INTERNET ACCESS NETWORK

(75) Inventors: Lida Nobakht, Campbell, CA (US); James R. W. Clymer, Mountain View, CA (US)

(73) Assignee: VIACLIX, Inc., Los Gatos, CA (US)

( * ) Notice: Subject to any disclaimer, the term of this patent is extended or adjusted under 35 U.S.C. 154(b) by 740 days.

(21) Appl. No.: 09/828,297

(22) Filed: Apr. 6, 2001

(65) Prior Publication Data

US 2001/0039584 A1 Nov. 8, 2001

Related U.S. Application Data

(63) Continuation-in-part of application No. 09/491,681, filed on Jan. 26, 2000, and a continuation-in-part of application No. 09/491,458, filed on Jan. 26, 2000, now Pat. No. 6,745,223, and a continuation-in-part of application No. 09/491,436, filed on Jan. 26, 2000, now Pat. No. 6,587,873.

(51) Int. Cl.[7] .............................................. G06F 15/16
(52) U.S. Cl. ...................... 709/227; 709/203; 709/218; 709/219; 709/229; 709/226; 725/109
(58) Field of Search .................. 709/203, 217–219, 709/226, 227, 229; 725/109

(56) References Cited

U.S. PATENT DOCUMENTS

| | | | |
|---|---|---|---|
| 5,734,589 A | | 3/1998 | Kostreski et al. |
| 5,818,935 A | | 10/1998 | Maa |
| 5,895,462 A | * | 4/1999 | Toki .............................. 707/3 |
| 5,895,471 A | | 4/1999 | King et al. |
| 5,987,612 A | | 11/1999 | Takagawa et al. |
| 6,002,394 A | | 12/1999 | Schein et al. |
| 6,018,768 A | | 1/2000 | Ullman et al. |
| 6,025,837 A | | 2/2000 | Matthews, III et al. |

(List continued on next page.)

FOREIGN PATENT DOCUMENTS

| | | |
|---|---|---|
| EP | 0963119 A1 | 12/1999 |
| WO | WO 97-49044 | 12/1997 |
| WO | WO 98/56188 | 12/1998 |
| WO | WO 99-35843 | 7/1999 |
| WO | WO 99/57905 | 11/1999 |
| WO | WO 99/63759 | 12/1999 |
| WO | WO 00/49505 A1 | 8/2000 |

OTHER PUBLICATIONS

"Slinky: A Url Server", Vogele et al; Proceedings of the Annual Conf. on Emerging Technologies etc., Aug. 1996, pp. 120–123.
"Internet Over Direct Broadcast Satellites", Clausen et al., IEEE Communications Mag, vol. 37, No. 6, Jun. 1999, pp. 146–151.
"A Cryptographically Secure EW Database With Selective Random Access", Ikram et al., 1997 IEEE, p. 1407–1411.
Consumer Electronics, Jan., 1997, pp. 43–48 (author unknown).

*Primary Examiner*—Hosain Alam
*Assistant Examiner*—Oanh Duong
(74) *Attorney, Agent, or Firm*—Bever, Hoffman & Harms, LLP; Patrick T. Bever (57) ABSTRACT

A channel-based network includes a system server, one or more Internet sites and one or more user terminals. The system server stores a series of computer pages and a master channel table that includes a list of channel numbers. Channel numbers and logo spaces are purchased by Internet sites wishing to be included in the network. The system server operator updates the computer pages to include logos for the Internet sites, and updates the master channel table each time a channel number is purchased. The updated web page and master channel table information is then downloaded to the user terminals of the network.

10 Claims, 11 Drawing Sheets

U.S. PATENT DOCUMENTS

| | | | |
|---|---|---|---|
| 6,061,719 A | | 5/2000 | Bendinelli et al. |
| 6,073,171 A | | 6/2000 | Gaughan et al. |
| 6,154,205 A | | 11/2000 | Carroll et al. |
| 6,163,316 A | * | 12/2000 | Killian ....................... 345/721 |
| 6,199,114 B1 | | 3/2001 | White et al. |
| 6,229,532 B1 | | 5/2001 | Fujii |
| 6,263,501 B1 | | 7/2001 | Schein et al. |
| 6,275,989 B1 | | 8/2001 | Broadwin et al. |
| 6,317,885 B1 | | 11/2001 | Fries |
| 6,330,595 B1 | | 12/2001 | Ullman et al. |
| 6,338,094 B1 | | 1/2002 | Scott et al. |
| 6,349,410 B1 | | 2/2002 | Lortz |
| 6,381,748 B1 | * | 4/2002 | Lin et al. ..................... 725/109 |
| 6,397,387 B1 | | 5/2002 | Rosin et al. |
| 6,400,407 B1 | | 6/2002 | Zigmond et al. |
| 6,438,751 B1 | | 8/2002 | Voyticky et al. |
| 6,466,981 B1 | | 10/2002 | Levy |
| 6,510,557 B1 | * | 1/2003 | Thrift ......................... 725/110 |
| 2002/0010941 A1 | * | 1/2002 | Johnson ..................... 725/108 |
| 2002/0026642 A1 | * | 2/2002 | Augenbraun et al. ....... 725/109 |
| 2003/0093807 A1 | * | 5/2003 | Nguyen ..................... 725/109 |
| 2003/0154492 A1 | * | 8/2003 | Falvo et al. ................ 725/113 |

* cited by examiner

FLASH 219

CHANNEL TABLE 219A

| CH. NO. | SITE NAME | SITE ADDRESS | JPEG LOGO |
|---|---|---|---|
| 010 | XYZ NEWS | WWW.XYZN.COM | Y |
| 020 | ON-LINE STORE | WWW.OLS.COM | Y |
| 030 | WEATHER CNTR | WWW.WC.COM | Y |
| 040 | ABC BROKERAGE | WWW.ABCB.COM | N |
| 050 | NET SCHOOL | WWW.NETS.COM | Y |
| 060 | ADULT SITE | WWW.ADULT.COM | Y |
| 411 | TEL DIRECTORY | WWW.ABELL.COM | N |
| 911 | AMBULANCE S. | WWW.SOS.COM | Y |

COMPUTER PAGE TABLE 219B

| COMP PAGE | LOGO(CH) | POSITION |
|---|---|---|
| MAIN | 010 | TOP LEFT |
| MAIN | 020 | TOP CENTER |
| MAIN | 030 | BOTTOM RIGHT |
| CAT1 | 060 | TOP LEFT |

| CHANNEL TABLE DATABASE 414 | | (MASTER CHANNEL TABLE 112-A) | |
|---|---|---|---|
| CHANNEL NUMBER | SITE ADDRESS | SITE NAME | GROUP |
| 000 ⋮ 099 | WWW.OLTV-A.COM ⋮ WWW.OLTV-Z.COM | ONLINE TV STATION A ⋮ ONLINE TV STATION Z | TV ⋮ TV |
| 100 ⋮ 199 | WWW.OLB-A.COM ⋮ WWW.OLB-Z.COM | ONLINE BANK A ⋮ ONLINE BANK Z | BANK ⋮ BANK |
| 200 ⋮ 299 | WWW.OLB-A.COM ⋮ WWW.OLB-Z.COM | ONLINE GAME A ⋮ ONLINE GAME Z | GAME ⋮ GAME |
| 300 ⋮ 399 | WWW.OLS-A.COM ⋮ WWW.OLS-Z.COM | ONLINE SHOP A ⋮ ONLINE SHOP Z | SHOP ⋮ SHOP |
| 400 ⋮ 499 | WWW.OLN-A.COM ⋮ WWW.OLN-Z.COM | ONLINE NEWS A ⋮ ONLINE NEWS Z | NEWS ⋮ NEWS |
| 500 ⋮ 599 | WWW.OLED-A.COM ⋮ WWW.OLED-Z.COM | ONLINE SCHOOL A ⋮ ONLINE SCHOOL Z | EDUC ⋮ EDUC |
| 600 ⋮ 699 ⋮ | WWW.PORTAL-A.COM ⋮ WWW.PORTAL-Z.COM ⋮ | INTERNET PORTAL A ⋮ INTERNET PORTAL Z ⋮ | PRTL ⋮ PRTL ⋮ |

METHOD FOR ESTABLISHING CHANNEL-BASED INTERNET ACCESS NETWORK

RELATED APPLICATIONS

The present invention is a continuation-in-part of U.S. patent application Ser. No. 09/491,681 entitled "Channel-Based Internet Network" filed Jan. 26, 2000, and is also related to U.S. patent application Ser. Nos. 09/491,458 entitled "User Terminal For Channel-Based Internet Network" now U.S. Pat. No. 6,745,223 B1 filed Jan. 26, 2000 and Ser. No. 09/491,436 entitled "System Server For Channel-Based Internet Network" now U.S. Pat. No. 6,587,873 B1 filed Jan. 26, 2000, each of which is incorporated by reference in its entirety.

FIELD OF THE INVENTION

The present invention relates to telecommunications, and more particularly to systems and methods used to generate profits from Internet commerce.

RELATED ART

The Internet is a modern communication system that allows computer operators (users) to network with other operators as well as a variety of Internet sites (databases). These Internet sites often provide useful information, such as news and weather information, or offer products or services that can be purchased by users using, for example, credit card numbers.

As the popularity of the Internet has grown, so has the potential for profit by companies engaged in Internet-based commerce (commonly referred to as "e-commerce"). As used herein, the term "e-commerce" refers to traditional commerce over the Internet—i.e., the sale of goods and services. In addition, the term "e-commerce" is used herein to refer to other uses of the Internet for profit, such as the hosting of banners by a more popular Internet site through which an Internet user passes to a less popular Internet site. Typically, the less popular Internet site pays the more popular Internet site an agreed to amount for each "hit" passing through the banner. A common factor that often determines the success or failure of these e-commerce companies is the number of users that access ("hit") that company's Internet site. That is, for Internet sites that sell goods and services, the greater the number of hits, the greater the potential for profit from the sale of products or services. Similarly, for Internet sits providing useful information, the greater the number of hits, the greater the chance that users will pass through a banner to a less popular Internet site paying for the banner.

A company's Internet site is typically found, for example, through advertising of the company's Internet address (URL) using conventional medium (e.g., television, radio, billboard, etc.), through banners posted in frequently-visited Internet sites, and through search engines provided by Internet portals.

Internet portals are multi-purpose Internet sites that, among other things, provide various types of general information (news, weather, stock quotes, etc.), post links to various Internet service sites, provide e-mail services, host online chat rooms and message boards, and provide search engine functions. Examples of popular Internet portals include Yahoo, AOL, and MSN. Internet portals often profit from subscriber Internet sites (i.e., Internet sites that pay the Internet portal to include their URLs and brief Internet site descriptions into that portal's search engine, and/or display banners or other links to the Internet sites). Internet sites that subscribe to one or more Internet portals greatly increase their chance of receiving "hits" due to the number of users that access the Internet portals in search of an Internet site providing a desired service. For example, a user seeking an Internet site that sells books may access an Internet portal and submit the term "BOOKS" to the portal's search engine. A list of Internet book sellers that subscribe to that Internet portal is then displayed for the user, who then accesses a selected Internet site from the displayed list.

Whether accessed directly or through an Internet portal, conventional Internet access technologies make the process of connecting to an Internet site difficult and expensive. Conventional Internet technologies typically utilize a sophisticated microprocessor (e.g., an Intel Pentium processor) and sophisticated software (e.g., Microsoft Windows '98 and Microsoft Access) that are incorporated into a person computer, which often costs more than $1,000.00. These technologies also require a user to perform several difficult interface processes using a QWERTY keyboard, for example, establishing a connection using an Internet Service Provider (ISP) by entering user information, and then entering URLs for desired sites. In addition, these conventional technologies require a user to enter, for example, a credit card number or other sensitive information that is transmitted to selected Internet sites.

Recognizing that there are a vast number of potential users that cannot afford to purchase a personal computer, or who are intimidated by personal computer operation, computer makers have sought to provide low cost and easy-to-understand Internet access systems. One attempt to provide such a system is produced by WebTV Networks, Inc. of Mountain View, Calif. The WebTV system provides a set-top box that connects to a user's television and allows the user to access the Internet using a wireless input device, thereby eliminating the cost of a computer monitor, while providing a convenient data input method. However, the WebTV set-top box is comparable to personal computers in price, and requires the user to master much of the same expensive and confusing software that is used on personal computers. Therefore, although the WebTV system makes accessing the Internet somewhat less complicated, it remains too expensive and complex for many potential users.

What is needed is a method for establishing an Internet network that both directs users to the Internet sites of the network in an easy-to-use manner, thereby maximizing the number of hits to each Internet site of the network. Ideally, each user terminal of the network would be significantly less expensive than conventional Internet access platforms, and as easy to use as a television.

SUMMARY

The present invention is directed to a channel-based Internet access network made up of user terminals that connect to selected Internet sites in response to channel numbers entered by a user. The channel numbers and associated Internet site addresses are downloaded from a central server to each user terminal of the network, and are displayed for the user on, for example, the user's television. To select an Internet site displayed on the user's television, the user merely enters the displayed channel number associated with the Internet site using a device similar to a television remote control. Consequently, the channel-based Internet access network allows a user to access selected Internet sites as easily as changing the channels on a television, thereby providing Internet access to those who are otherwise intimidated by Internet access using personal computers. Specifically, because many people who are accustomed to using a television remote control find QWERTY keyboards and the URLs of conventional Internet access platforms intimidating, the channel-based network of the present invention is likely to greatly increase the number of people that access the Internet on a regular basis.

The present invention is particularly directed to methods for establishing and operating a channel-based Internet network by allocating channel numbers to the Internet sites and Internet portals that wish to be accessed by the user terminals. In comparison to conventional Internet access using personal computers, the channel-based Internet network of the present invention promotes relatively frequent Internet site "hits" because the number of Internet sites that are accessible on the network is limited to the number of channel numbers assigned by the network administrator. That is, instead of the unlimited number of Internet sites accessible by Internet users using personal computers, the number of Internet sites accessed through the channel-based Internet network is limited to X, where X represents the number of channel numbers assigned by the network administrator. When X is relatively low, the probable number of "hits" for a particular site having an assigned channel number is relatively high because users have fewer Internet sites to select. Further, by obtaining a channel number in a group of channel numbers assigned to similar Internet sites (e.g., online stores), the probable number of "hits" for a particular Internet site is increased by users that "surf" the channel numbers (e.g., press a "NEXT CHANNEL" button on the remote control). Consequently, by subscribing to the channel-based Internet network of the present invention (i.e., by being assigned a channel number), an Internet site greatly increases its chance of being "hit", thereby enhancing profitable e-commerce.

In accordance with a first embodiment of the present invention, a method is provided for incorporating individual Internet sites into a channel-based Internet network by allocating channel numbers to the individual Internet sites. The method includes receiving a request for a channel number assignment from an Internet site having an Internet address, assigning a selected channel number to the requesting Internet site, updating a master channel table stored in the channel table database of the network server to reflect the assigned channel number, and transmitting the updated master channel table information to the user terminals of the channel-based Internet network. Typically, the network administrator solicits requests for channel number assignment by offering available channel numbers to selected Internet sites for a fixed or negotiated fee. In one embodiment, the fee is determined by the particular channel number requested. For example, easy-to-remember (preferred) channel numbers such as "123", "111", or "999" are offered at a higher price than other, less-easy-to-remember (non-preferred) channel numbers. In another embodiment, the fee is determined by the number of user terminals in the network. Typically, the larger the number of user terminals, the higher the probability of "hits" to each Internet site, and the higher calculated fee for each channel number. Accordingly, when an easy-to-remember channel number is requested by an Internet site, the network administrator first verifies the channel number's availability, calculates a fee that includes a premium for the requested channel number, and then asks the requesting Internet site to confirm the assignment at the calculated fee. Alternatively, when a channel number is not specified by a requesting Internet site, the service type (e.g., online shopping) provided by the requesting Internet site is identified, then a channel number selected from a group of channel numbers associated with the identified service type, the fee is calculated, and then confirmation is requested from the requesting Internet site. Upon confirmation of the channel number assignment, the requesting Internet site's address (e.g., URL) and site name are entered in the channel table database in fields associated with the assigned channel number. Subsequently, the user terminals download the updated channel table information, thereby allowing the user to access the requesting Internet site by entering the assigned channel number.

In accordance with a second embodiment of the present invention, a method is provided for displaying logos for Internet sites in a channel-based Internet network by allocating logo space on a series of Web pages utilized to display channel numbers. The method includes receiving a request for a logo space assignment from an Internet site having a number, assigning a selected logo space to the requesting Internet site, updating the server to store Web page information indicating the placement of the logo and a master channel table to store the logo (e.g., jpeg), and transmitting the updated Web page and master channel table information to the user terminals of the channel-based Internet network. When a user subsequently calls the updated Web page, the user terminal displays the logo and the assigned channel number, thereby further advertising the Internet site to users. Subsequently, when a user selects (clicks on) the logo, the channel based system accesses the Internet site using the address stored in the channel table, and downloads information from the Internet site. Because the channel table is utilized to access Internet sites identified by the logos, the required amount of memory space is limited, thereby making the user terminal inexpensive to manufacture.

The present invention will be more fully understood in view of the following description and drawings.

DETAILED DESCRIPTION

Figure 1:
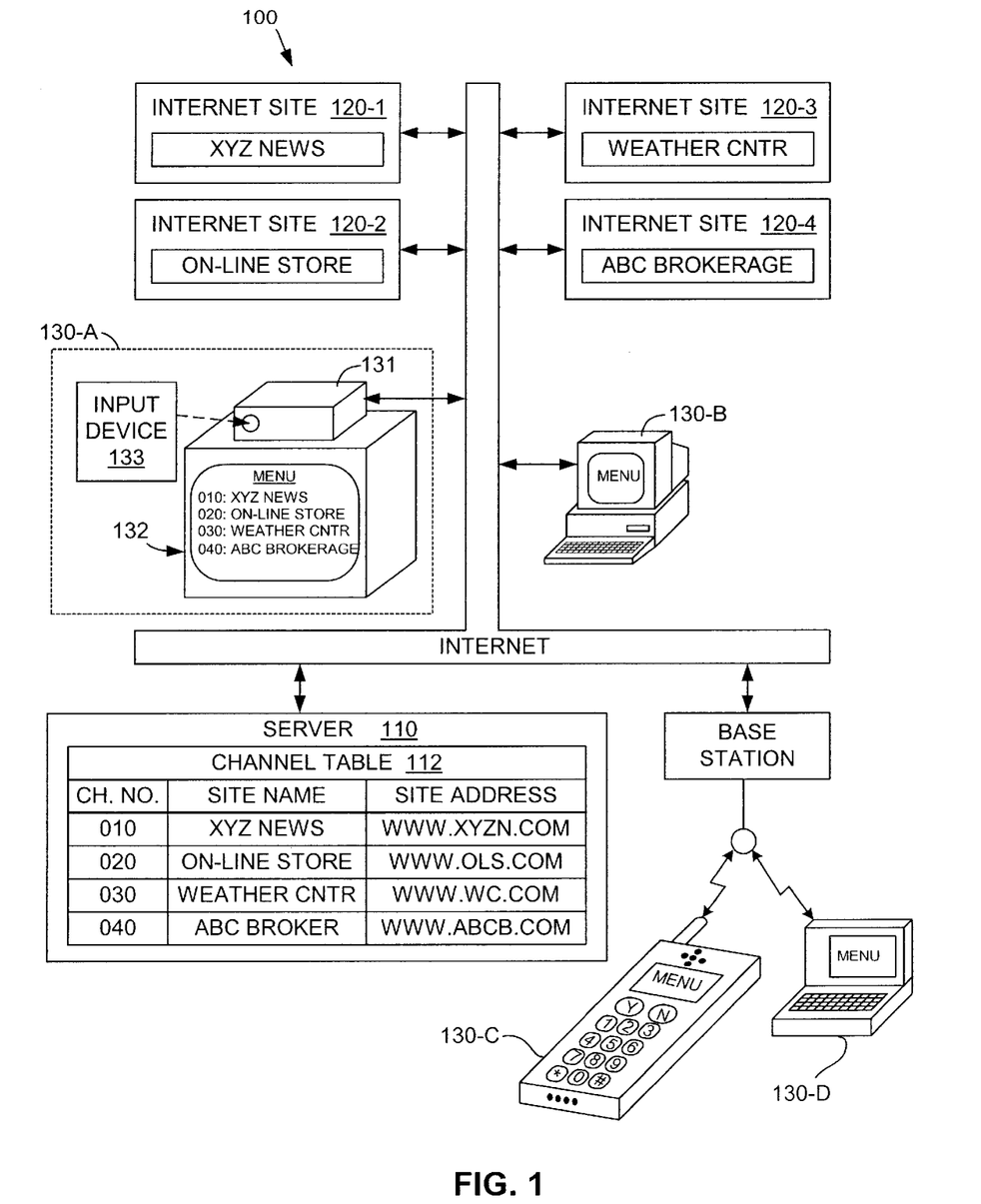
FIG. 1 is a block diagram showing a channel-based network that is established by the present invention.

FIG. 1 shows a channel-based network 100 according to an embodiment of the present invention. Network 100 includes a system server 110, Internet sites 120-1 through 120-4, and user terminals 130-A through 130-D. As indicated in FIG. 1, user terminal 130-A includes set-top box 131, video display 132, and input device 133. System server 110, Internet sites 120-1 through 120-4, and user terminals 130-A through 130-D are connected to the Internet using known communication hardware and methods. These elements are described briefly below, and in more detail in commonly owned, co-pending U.S. patent application Ser. No. 09/491,681, which is hereby incorporated by reference in its entirety.

System server 110 stores a master channel table 112, which includes a list of channel numbers (CH. NO.), Internet site names (SITE NAME), and Internet addresses (SITE ADDRESS). The Internet site addresses and Internet site names are stored in fields associated with the channel numbers such that an associated address and associated name are assigned to each channel number in accordance with the methods described below. For example, referring to FIG. 1, Internet site address "www.XYZN.com" and Internet site name "XYZ NEWS" are stored in respective fields associated with channel number "010". FIG. 1 also shows Internet site addresses and Internet site names for channel numbers "020", "030", and "040". Although only four channel numbers are shown in FIG. 1, it is understood that the actual number of channel numbers (and associated address/name information) stored in master channel table 112 is not limited to four.

Each user terminal 130-A through 130-D includes circuitry for downloading channel table data from server 110, storing a local copy of the channel table information, and displaying the channel numbers and Internet site names from the downloaded channel table data. By displaying the Internet site names and associated channel numbers, a user is able to access an Internet site simply by entering a selected channel number. That is, upon entering a selected channel number, the user terminal accesses the Internet address field associated with the selected channel number, and transmits the Internet address stored therein onto the Internet. Accordingly, the user is able to access a selected Internet site without knowing the URL for the selected site, and without having to type in the Internet address using a QWERTY keyboard. In effect, the process of accessing a selected Internet site is essentially identical to accessing a selected television channel.

Figure 2:
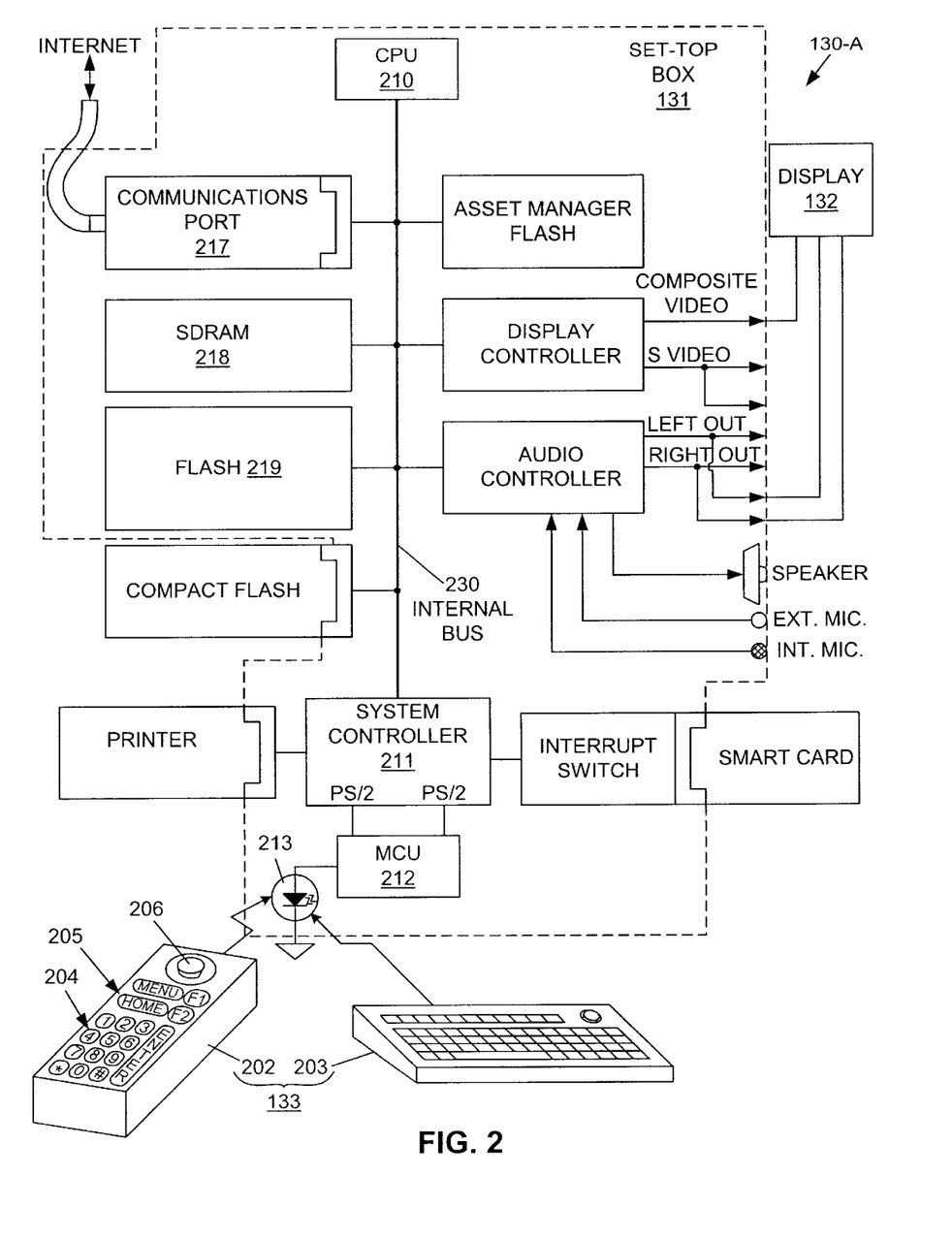
FIG. 2 is a block diagram showing an example of a user terminal of the channel-based network shown in FIG. 1.

FIG. 2 is a block diagram showing user terminal 130-A in accordance with one embodiment of the present invention. User terminal 130-A is described briefly below—a detailed description is provided in co-pending U.S. patent application Ser. No. 09/491,681, cited above.

In the embodiment shown in FIG. 2, input devices 133 include a remote control 202 and wireless keyboard 203. Remote control 202 includes a numeric keypad 204, one or more dedicated keys 205, and a joystick 206. Although not specifically indicated, wireless keyboard 203 includes similar dedicated keys, numeric keypad, and joystick as those provided on remote control 202. In addition, keyboard 203 includes a standard QWERTY keyboard for entering text messages (e.g., for transmitting e-mail), but is not necessary for accessing the Internet sites of the channel-based network shown in FIG. 1.

Set-top box 131 includes central processing unit (CPU) 210, system controller 211, micro-controller unit (MCU) 212, IR receiver 213, communication port 217, synchronous dynamic random access memory (SDRAM) 218, dedicated flash memory 219, and additional elements that are described in more detail in co-pending U.S. patent application Ser. No. 09/491,681, cited above. The various elements are connected by an internal bus 230 as illustrated. CPU 210 interfaces directly with system controller 211. CPU 210 and system controller 211 are coupled to the other elements of set-top box 131 as illustrated. Communications port 217 facilitates communication data transfer between set-top box 131 and the Internet. SDRAM 218 temporarily stores channel table information during operation of set-top box 131. Flash memory 219 provides non-volatile storage for the one or more "local" channel tables 219A–219B that are downloaded from server 110 (see FIG. 1). After a user is authorized to use set-top box 131, that user's channel table (e.g., channel table 219A or 219B) is copied into SDRAM 218, where it is accessed using input devices 133 to connect set-top box 131 to selected Internet sites. CPU 210 and system controller 211 combine with display controller 223 to support the display of information on display 132 (e.g., a conventional television). Display controller 223 also supports the display of information on color or monochrome LCD panels, including QVGA panels and SVGA panels.

Figure 3:
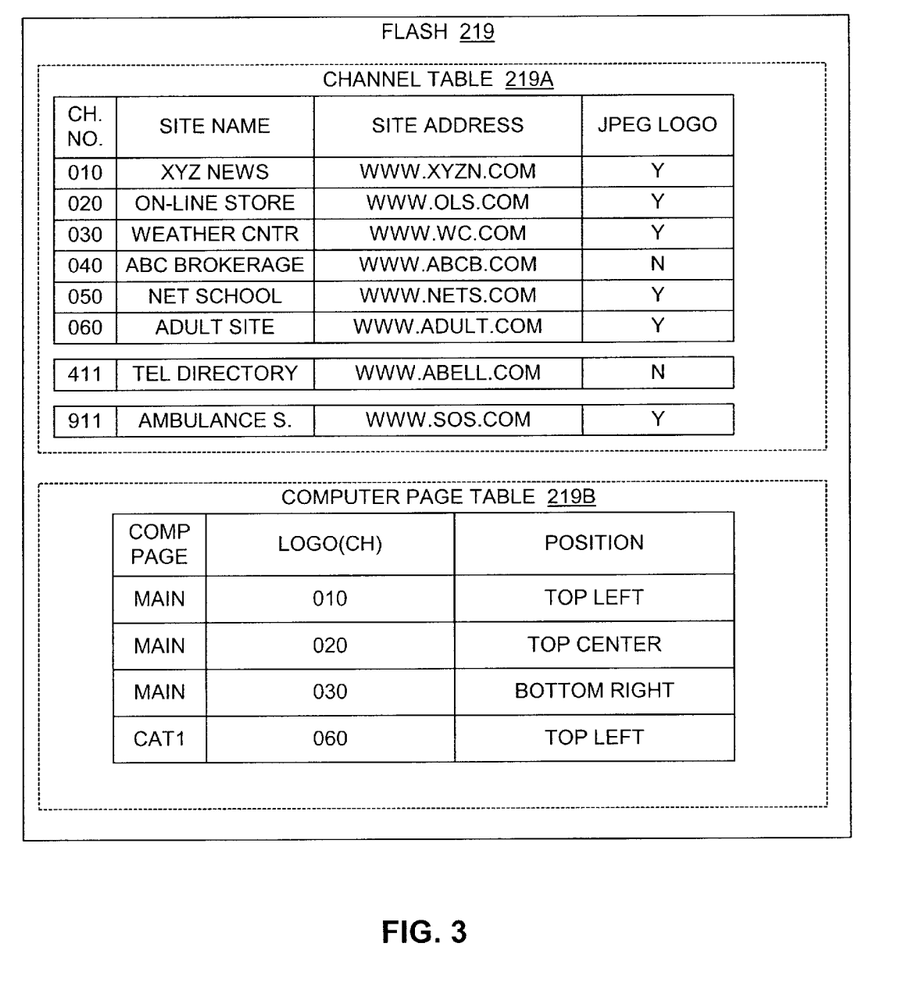
FIG. 3 is a simplified diagram depicting the contents of a channel table flash memory of the user terminal shown in FIG. 2.

FIG. 3 is simplified diagram depicting an example of the data stored in flash memory 219. Flash memory 219 is divided into two or more sections (e.g., channel table 219A and computer page table 219B). Channel table 219A stores channel table data (i.e., channel number, Internet site name, site address, and logo file). Each channel number is encoded as a unicode value that is assigned by server 110 (FIG. 1) to a particular Internet site. Each Internet site name is a text field that includes either a description of an associated Internet site, or a recognizable Internet name (e.g., America Online). Each logo is stored in, for example, a jpeg format. Computer page table 219B depicts a collection of page information that is displayed in accordance with a pre-defined general user interface (GUI). Each computer page (e.g., a MAIN page) includes one or more logos that are assigned according to known techniques such that they are displayed with the associated computer page in the manner described below.

Figure 4:
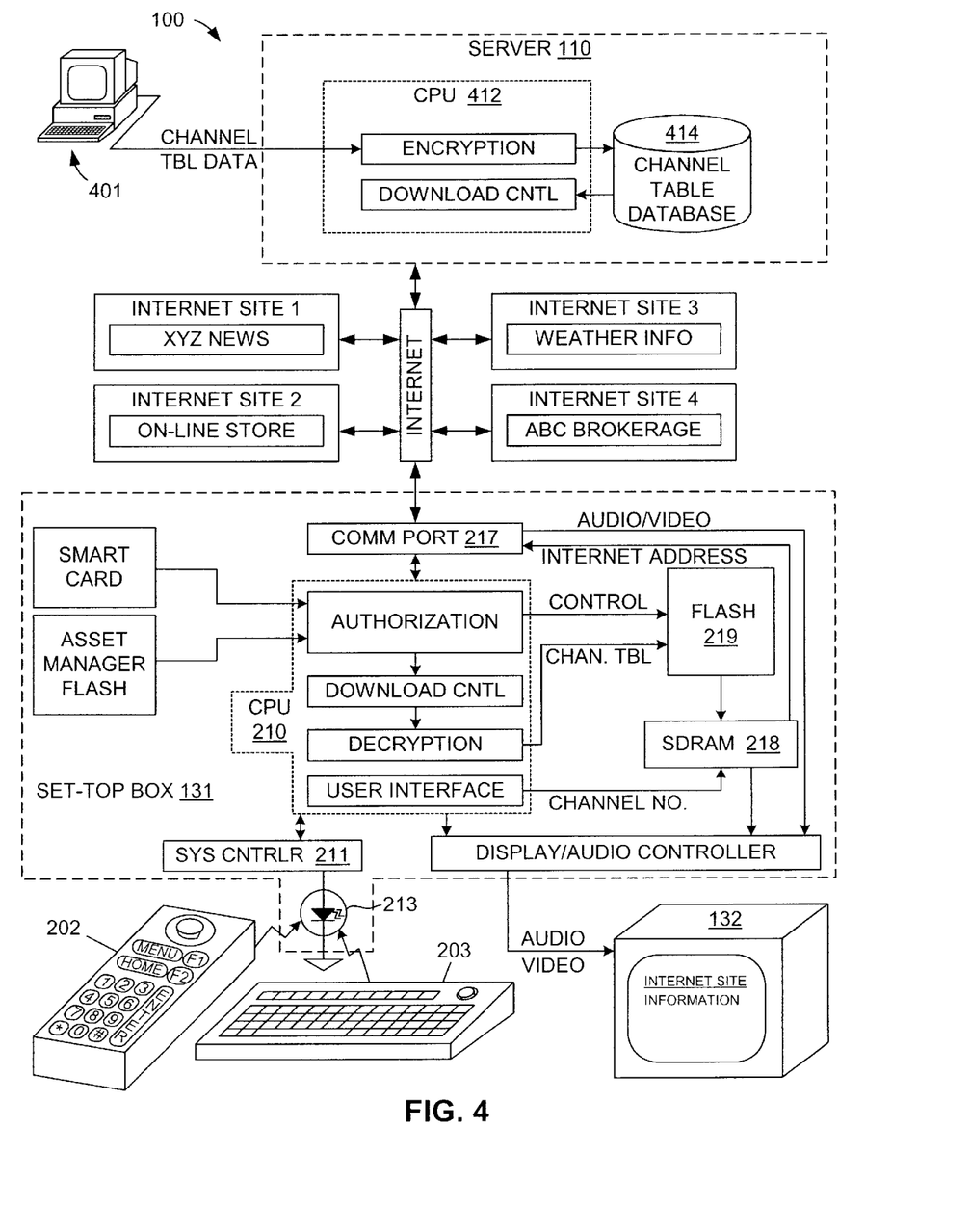
FIG. 4 is a block diagram showing various system functions performed by the channel-based network during the execution of the present invention.

FIG. 4 is a simplified block diagram showing various system functions performed by channel-based network 100. Specifically, FIG. 4 depicts various functions executed by server 110 and set-top box 131 to establish channel-based network 100. Referring to the upper portion of FIG. 4, server 110 includes an input terminal 401 (e.g., a personal computer or workstation), a CPU 412, and a channel table database 414, which also stores computer page information. Input terminal 401 is used to enter channel table data and computer page information into channel table database 414 using known techniques. Upon establishing a user's authorization for set-top box 131, channel table data and computer page information is downloaded to set-top box 131 over the Internet, and stored in channel table flash memory 219 and SDRAM 218. Subsequent user interface commands are entered from input devices 133 through IR receiver 213, micro-controller unit (MCU) 212, system controller 211, and central processing unit (CPU) 210. Channel numbers entered in this manner are routed to SDRAM 218, from which associated Internet addresses are read and transmitted onto the Internet via communications port 217. Further description of the functions performed by server 110 and set-top box 131 is provided in co-pending U.S. patent application Ser. No. 09/491,681.

Establishing Channel-Based Network

In accordance with a first embodiment of the present invention, a method is provided for establishing and operating channel-based network 100, described above, by allocating channel numbers to the Internet sites that wish to be included in the network (i.e., to be accessed by the user terminals). As described above, when an Internet site is assigned a channel number, the Internet address and site name for that Internet site are automatically downloaded to the user terminals of channel-based network 100 (i.e., downloaded without requiring the user to enter any command or identification data through a QWERTY keyboard). In a practical embodiment, the number of channel numbers assigned to associated Internet sites is limited to a finite number (e.g., 1,000 or 10,000), thereby limiting user terminal access to a finite number of Internet sites. Although Internet access is thus limited, channel-based Internet network 100 appeals to a wide range of Internet users that are willing to sacrifice unlimited Internet site access in exchange for user terminals that are less expensive than conventional platforms (e.g., personal computers), and that facilitate Internet access using a numerical keypad input device similar to a television remote control (e.g., remote control 202; see FIG. 4). Therefore, an Internet site's profitability significantly benefits by its association with channel-based Internet network 100 (i.e., by being assigned a channel number) because the Internet site becomes one of a finite number of Internet sites available to the user terminals connected to channel-based network 100. This exclusive association with channel-based network 100 increases the chances of "hits" for each associated Internet sites.

According to a first embodiment of the present invention, a process is provided for establishing a channel-based network 100 by assigning (allocating) individual channel numbers to associated Internet sites. Briefly described with reference to FIG. 1, network server 110 receives a request for a channel number assignment from an Internet site (e.g., site 120-1), for example, in response to an advertisement broadcast by the network proprietor (i.e., the owner of network server 110). In response to the request, a channel number is assigned to the Internet site, and an Internet address and an Internet site name provided by the Internet site are stored fields associated with the assigned channel number in master channel table 112. During subsequent user terminal download operations, the updated channel table information (including the Internet name and address for the Internet site, along with an optional logo file) and computer page information are stored in user terminals 130-A through 130-D. The computer pages are then used to display channel number and Internet site names, for example, on a television 132 connected to set-top box 131. In a first embodiment, the user then reads the Internet site name and selectively accesses the Internet site by entering the associated channel number using a numeric keypad provided on input device 133. In response, set-top box 131 transmits the Internet address associated with the entered channel number onto the Internet, thereby establishing a connection between the Internet site and set-top box 131 without requiring the user to type in the Internet address (e.g., URL) using a QWERTY keyboard.

Figure 5:
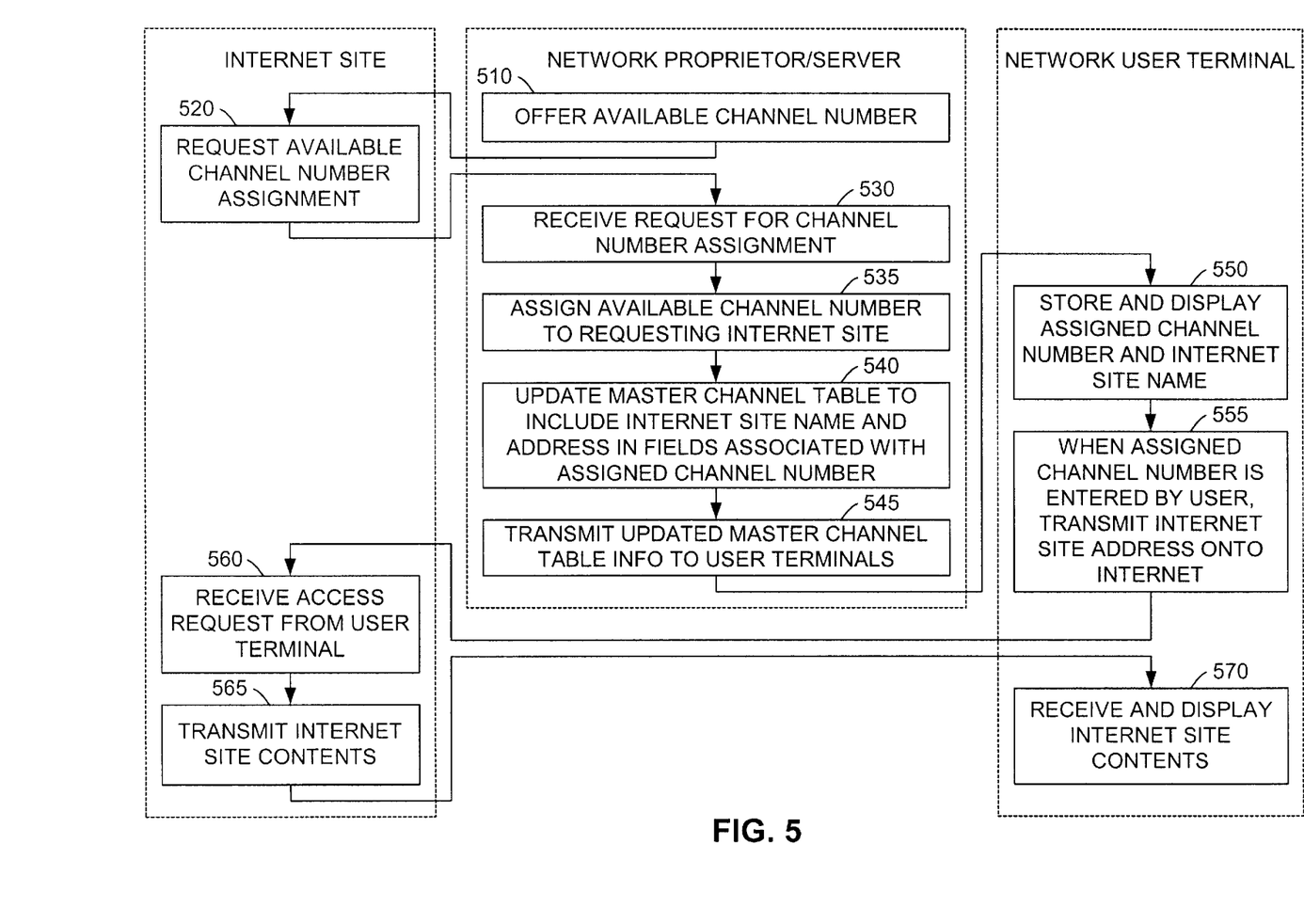
FIG. 5 is a flow diagram showing a method of assigning individual channel numbers to associated Internet sites in a channel-based network according to a first embodiment of the present invention.

FIG. 5 is a flow diagram showing a process of establishing channel-based network 100 according to the first embodiment. Referring to the center column of FIG. 5, the network proprietor offers an available channel number to an Internet site (step 510). In response, as shown in the leftmost column of FIG. 5, the Internet site requests the available channel number (step 520). Returning to the center column of FIG. 5, upon receiving the request (step 530), the network proprietor assigns the available channel number to the requesting Internet site (step 535), and then updates master channel table 112 (see FIG. 1) to include an Internet site name and address (which are provided by the requesting Internet site) in fields associated with the available channel number (step 540). The process of updating master channel table 112 is performed, for example, using input terminal 401 (see FIG. 4). Subsequently, the updated master channel table information, which includes the newly-assigned channel number, is transmitted over the Internet to one or more user terminals (step 545). Referring to the rightmost column of FIG. 5, upon downloading the updated channel table information, the user terminal stores and displays the assigned channel number and Internet name in the manner described above (step 550). Subsequent entry of the assigned channel number by the user terminal's owner causes the user terminal to transmit the Internet address associated with the assigned channel number onto the Internet (step 570). Shifting to the leftmost column of FIG. 5, upon being contacted by the user terminal (step 560), the Internet site transmits content data to the user terminal (step 565) using known techniques. Finally, as indicated in the rightmost column of FIG. 5, the content data transmitted from the Internet site is displayed by the user terminal using known techniques.

Figure 6:
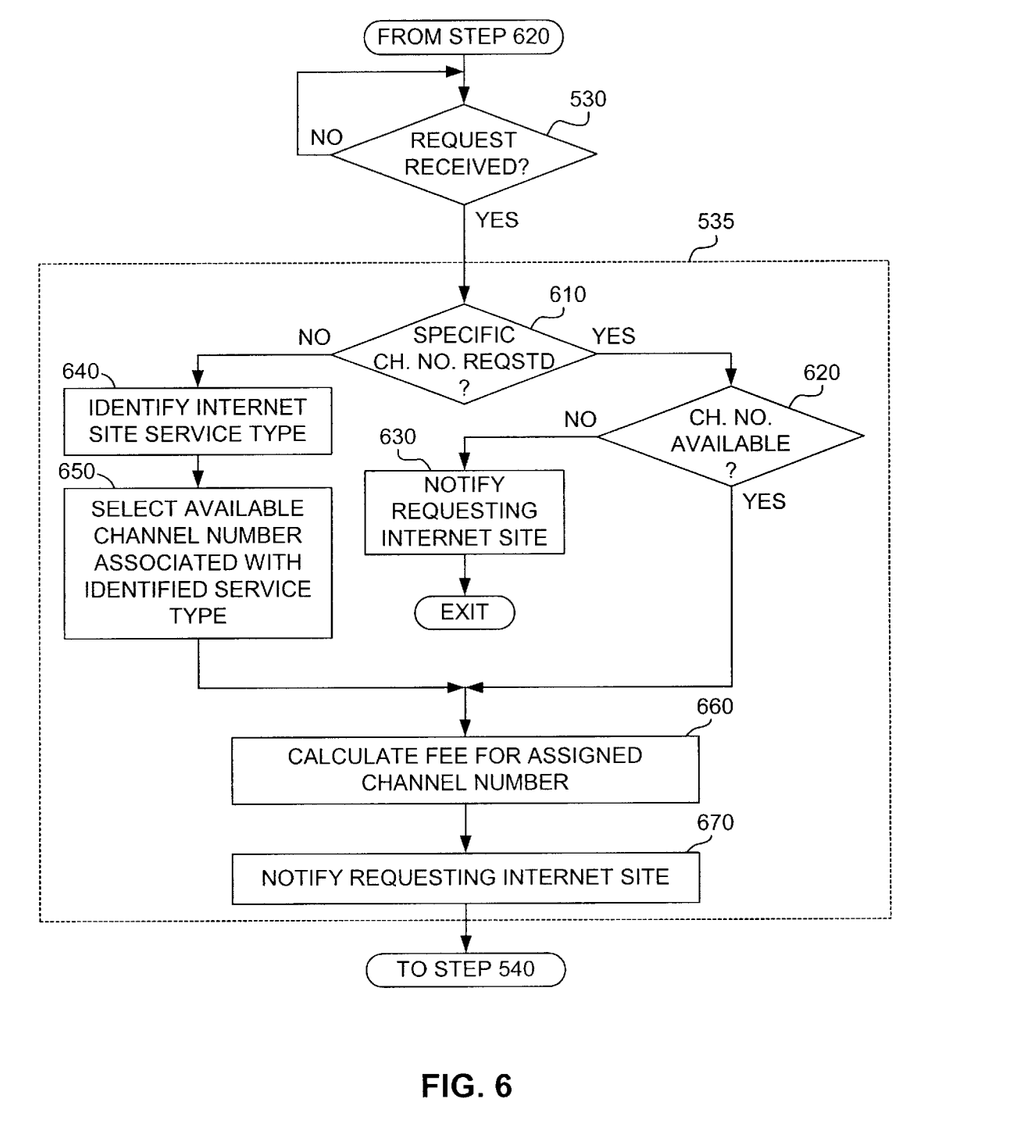
FIG. 6 is a flow diagram showing a channel assignment process of the method shown in FIG. 5 in additional detail.

FIG. 6 is a flow diagram showing a channel assignment process (step 535; FIG. 5) that is utilized in the channel-based network establishment process according to an embodiment of the present invention. Referring to FIG. 6(A), the channel assignment process is performed after a request for channel number assignment is received from a requesting Internet site (step 530).

During a first step of the channel assignment process, the network proprietor determines whether or not a specific channel number has been requested (step 610). A specific (preferred) channel number may be requested because, for example, the channel number is easy-to-remember, such as "123", "111", or "999".

When a specific channel number is requested, the network proprietor verifies the requested channel number's availability (step 620), and then either notifies the requesting Internet site if the channel number is already assigned (step 630). Conversely, if the channel number is available (i.e., not previously assigned), proceeds to calculate a fee for assigning the requested channel number (step 660).

When a specific channel number is not requested, the network proprietor determines the type of service (or products) provided by the requesting Internet site (step 640), then selects an available channel number from a group of channel numbers that are associated with the identified service type (step 650). This selection process is described further with reference to FIG. 7.

Figure 7:
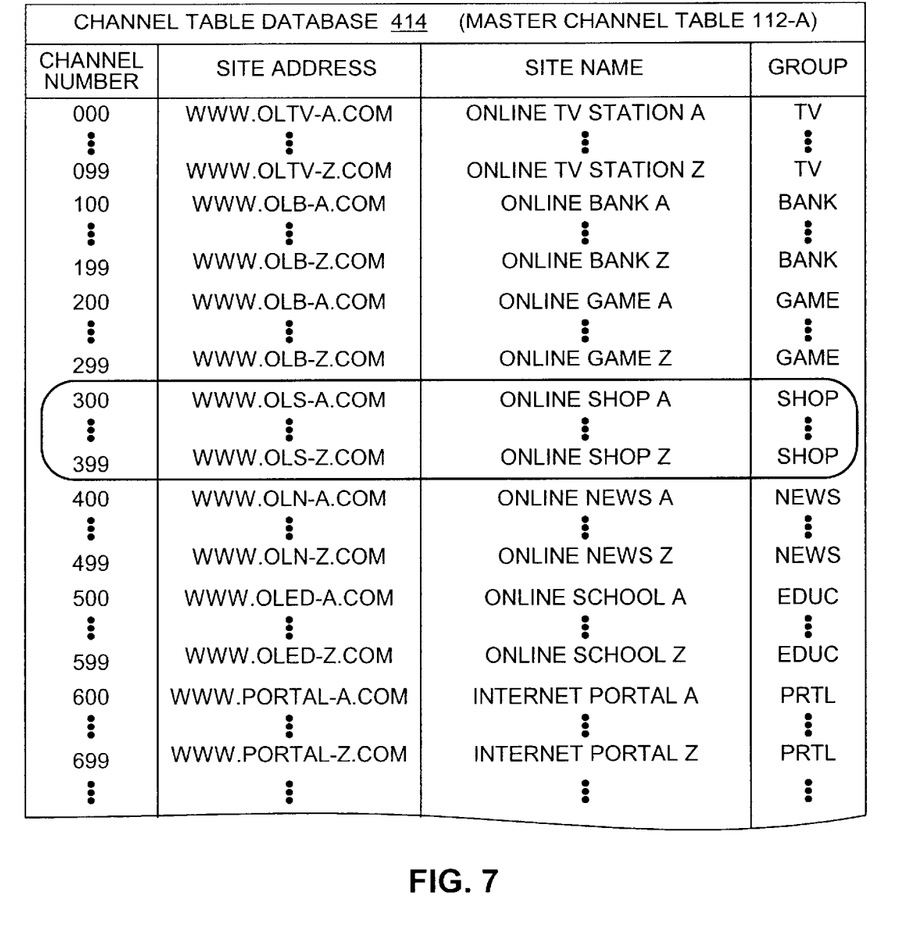
FIG. 7 is a simplified diagram showing the channel numbers of the channel-based network group by Internet site service type.

FIG. 7 is a simplified diagram showing channel numbers of the channel-based network that are grouped by Internet site service type in accordance with an exemplary embodiment. Referring to FIG. 7, channel numbers "000" through "099" are designated for television stations, channel numbers "100" through "199" are designated for online bank sites, etc. In one example, if the requesting Internet site is an online store, a channel number is selected from the channel number group "300" through "399". By grouping the channel numbers by service type, a user is able to "surf" through similar sites (e.g., online television stations) simply by pressing a "next channel" key provided on remote control. After a channel number is assigned, the fee is calculated for the assigned channel number (step 660).

Returning to FIG. 6, after a channel number is selected for the requesting Internet site, a fee is calculated for the channel number assignment (step 660). In accordance with the present invention, in return for establishing and maintaining the channel-based network, the network proprietor is paid by the Internet sites that are assigned channel numbers. In one embodiment, the fee paid for each channel number is calculated in the manner described below with reference to FIG. 8. In other embodiments, the fee is a flat rate fee, or based on another payment schedule. Note that, in one embodiment, each user also pays the network proprietor for access to the network through the user terminals.

Figure 8:
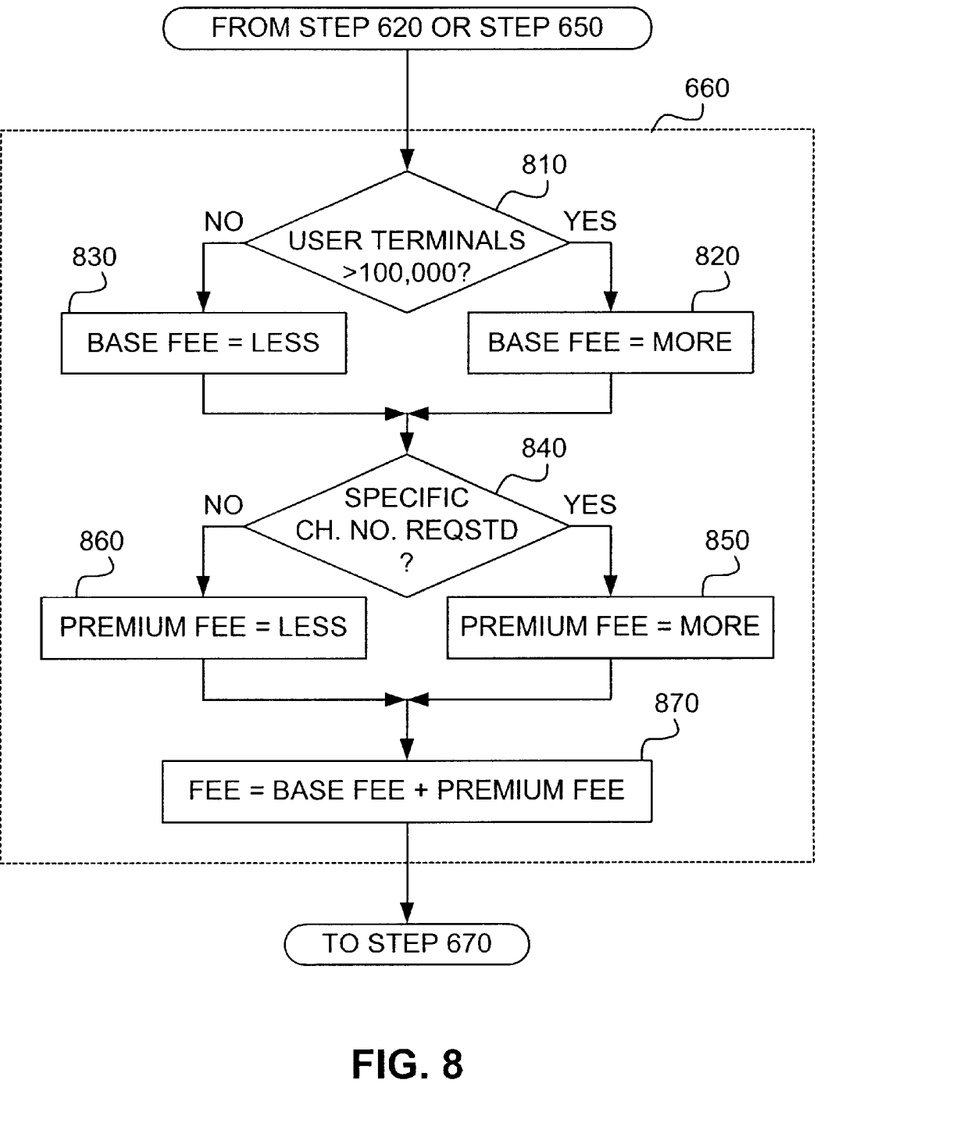
FIG. 8 is a flow diagram showing a fee calculation process utilized in the channel assignment process of FIG. 6.

FIG. 8 is a flow diagram showing fee calculation (step 660; see FIG. 6) according to an embodiment of the present invention. As discussed with reference to FIG. 6, fee calculation is performed after the network proprietor determines that a requested channel number is available (step 620; see FIG. 6), or assigns a selected channel number (step 650; FIG. 6).

In the present embodiment, a first step in the fee calculation process is to calculate a base fee that is proportional to the number of user terminals accessing the channel-based network (step 810). As discussed above, the larger the number of user terminals, the higher the probability of "hits". Accordingly, in the embodiment disclosed in FIG. 8, when the number of user terminals is greater than a predetermined number (e.g., 100,0000), a relatively high base fee is used in the fee calculation (step 820), and when the number of user terminals is below the predetermined number, a relatively low base fee is used (step 830). Those of ordinary skill in the art will recognize that many alternative embodiments may be used to calculate the base fee (e.g., multiplying the number of active user terminals by a constant number, entering the number of user terminals in a polynomial or other mathematical equation, etc.), and that the disclosed embodiment is merely exemplary.

After the base fee is calculated, a premium fee is determined that is proportional to a relative value of the assigned channel number. As discussed above, some channel numbers are specifically requested because they are easy to remember and/or may have other cultural significance for a particular region, thereby increasing the likelihood that the Internet sites assigned to these channel numbers will be visited more frequently. Accordingly, the channel number assignment request is analyzed to determine if a specifically requested channel number was assigned (step 840). Note that when a specific channel number is requested/assigned, a relatively higher premium fee is applied (step 850). Conversely, when channel number is randomly selected/assigned, then a relatively low (e.g., zero) premium fee is applied (step 860). Those of ordinary skill in the art will recognize that many alternative embodiments may be used to determine the premium fee (e.g., assigning highly desirable channel numbers a higher value than other requested channel numbers), and that the disclosed embodiment is merely exemplary.

Finally, after the base and premium fees are calculated/determined, these fees are combined to form a total calculated fee for the assigned channel number (step 870). In the disclosed embodiment, the total fee is calculated by adding the base and premium fees. However, many alternative embodiments may be used to combine the base and premium fees. Further, one of the base and premium fees may be omitted, or the base and premium fees may be combined using a single calculation. Moreover, other factors may be included in the calculation of the total fee for each assigned channel number.

Returning to FIG. 6, after calculating a fee for the selected/requested channel number (step 660), the requesting Internet site is notified regarding the calculated fee (step 670). In an optional embodiment, confirmation that the calculated fee is acceptable is requested from the Internet site (not shown). Upon confirmation of the channel number assignment, the requesting Internet site's address (e.g., URL) and site name are entered in the channel table database in fields associated with the assigned channel number (step 540; see FIG. 5).

Figure 9A:
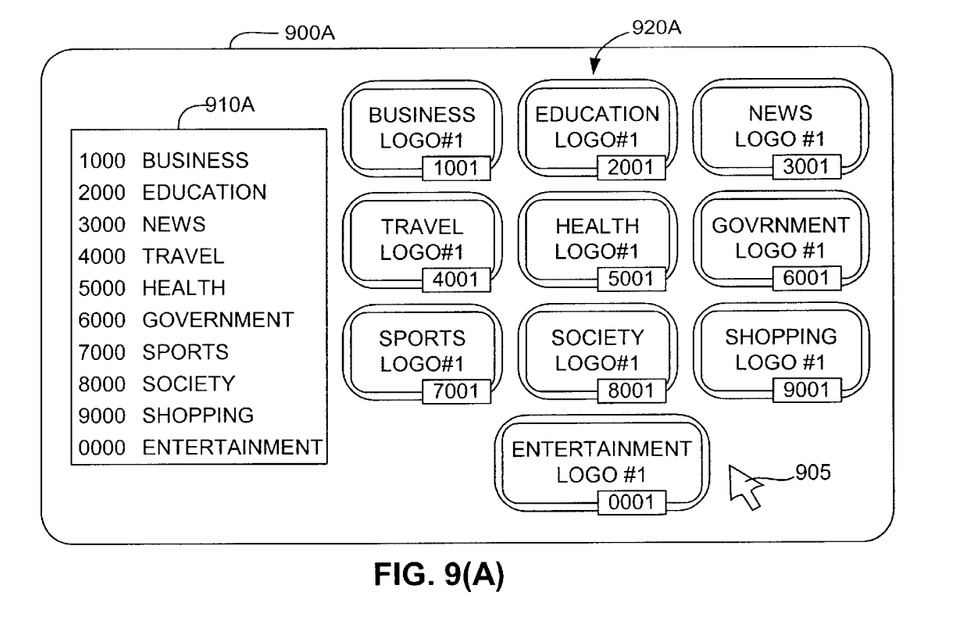
FIGS. 9(A) and 9(B) are screen displays showing successive arrangements of channel numbers and logos according to a second embodiment of the present invention.
Figure 9B:
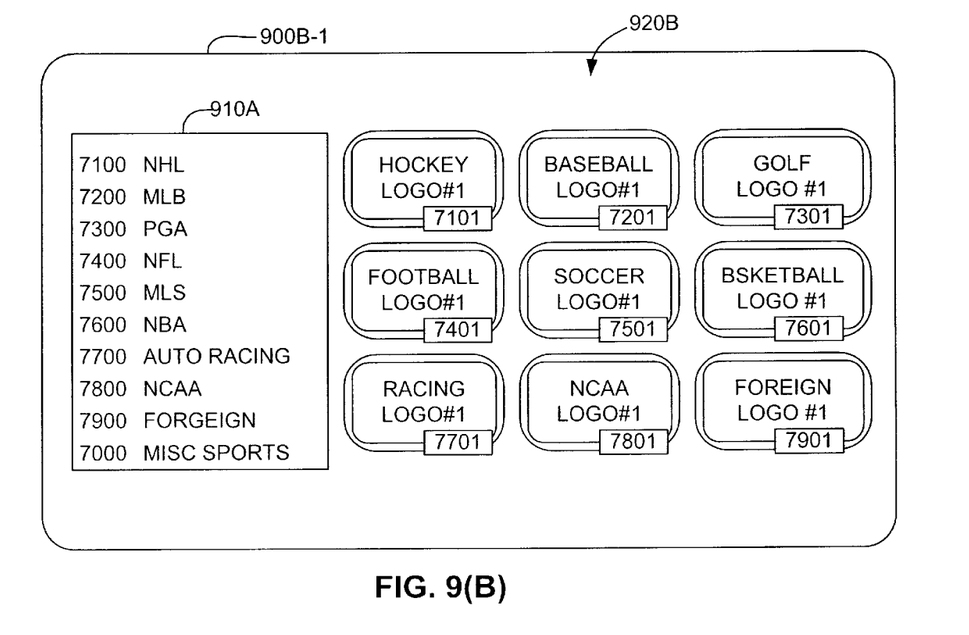

FIGS. 9(A) and 9(B) depict computer pages 900A and 900B, respectively, that are displayed in accordance with an aspect of the present invention. In particular, computer pages 900A and 900B are data files stored in flash memory 219, and are displayed on monitor 132 (see FIG. 4). In one embodiment, computer pages 900A and 900B are written in a Standard Generalized Markup Language (SGML) such as Hypertext Markup Language (HTML). Computer page 900A includes a channel number table 910A and a group of logos 920A that are arranged in rows and columns next to channel number table 910A. Each logo 920 identifies an Internet site and the channel number associated with the Internet site. Because computer pages 900A and 900B are written in HTML, they are easily and conveniently updated and downloaded to each user terminal of the channel-based network.

In one embodiment, the computer pages stored in flash memory 219 (see FIG. 4) are associated such that selection of a particular category from one computer page calls an associated second page. For example, FIG. 9(A) depicts a main computer page 900A that is displayed when a user terminal is powered up. Main computer page 900A includes a menu 910A of channel category numbers (e.g., "7000 Sports") that indicate categories of Internet sites accessible through the channel-based network. Entering channel "7000" (or selecting channel number "7000" using a cursor 905) causes sports category page 900B (FIG. 9(B)) to replace main page 900A. Sports category page 900B includes a second channel number menu 910B that lists multiple sports categories (e.g., NHL hockey, category number 7100). Accordingly, multiple computer pages are associated such that selected pre-assigned channel numbers are used to "link" to pre-defined computer pages stored in flash 219 (i.e., instead of associated Internet sites, which are accessed through the Internet).

Figure 10:
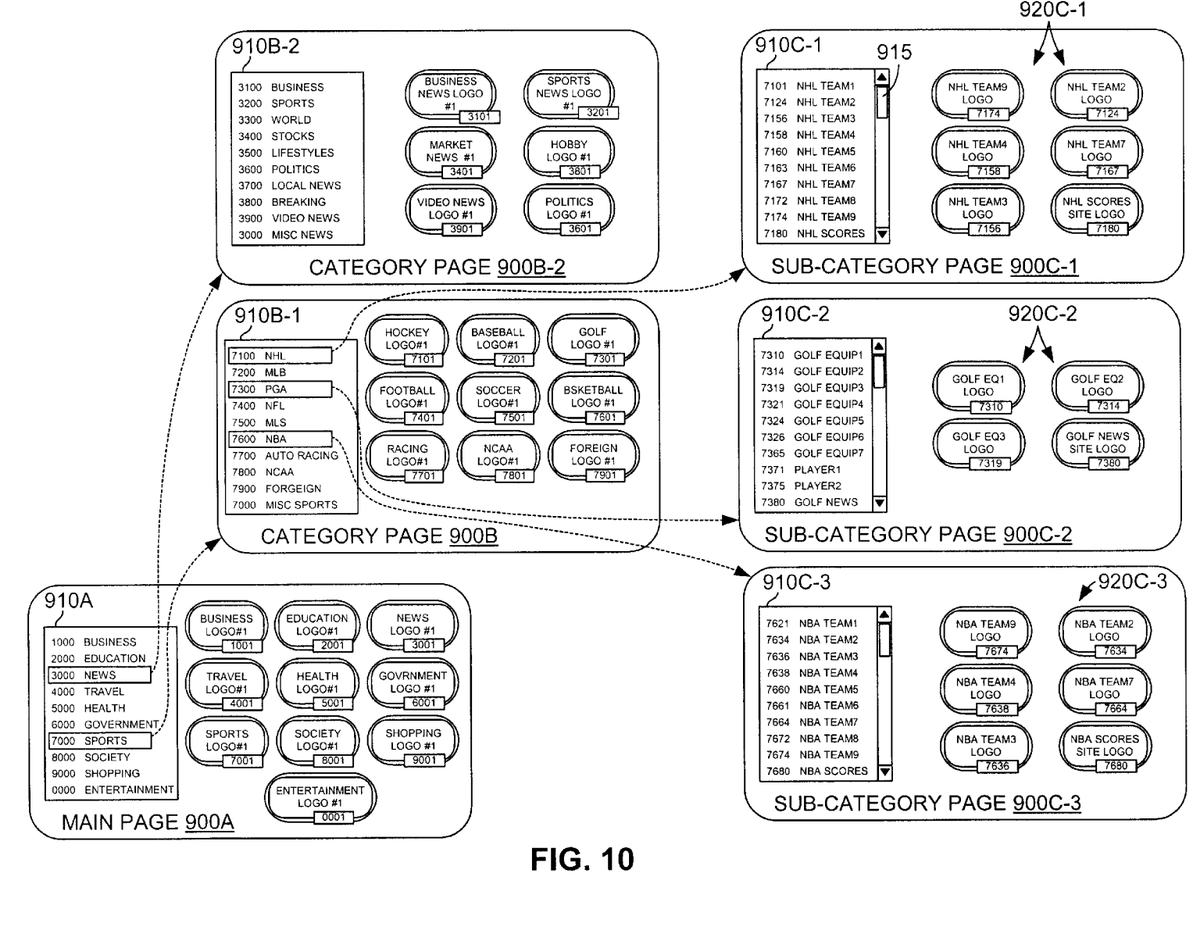
FIG. 10 is an exploded diagram depicting multiple Web page levels associated with the second embodiment.

FIG. 10 is an exploded view depicting an example of how several computer pages 900A through 900C3 are logically arranged in accordance with the subject matter selected from channel table 910A of main computer page 900A. As indicated on the left side of a FIG. 10, main computer page 900A represents a "home" or default page that is displayed each time a user session is initiated. Category pages (e.g., sports category page 900B, also shown in FIG. 9(B), and a news category page 900B-2) are called by selecting associated main category channel numbers listed in main channel number table 910A. For example, entering channel number "3000" causes news category page 900B-2 to display categories of Internet news sites. Similarly, as mentioned above with reference to FIGS. 9(A) and 9(B), entering channel number "7000" causes sports category page 900B to be displayed. Sports category page 900B includes a second channel number table 910B that lists multiple sports sub-categories (e.g., NHL hockey, sub-category number 7100). Entering sub-category 7100 passes control to sub-category page 900C-1, which includes a channel number table 910C-1 listing selected NHL team sites and other NHL related Internet sites. Note that a scroll bar 915 is provided using known techniques to facilitate the display of a large number of NHL sites. Similarly, entering sub-category 7300 passes control to PGA sub-category page 900C-2, which includes a channel number table 910C-2 listing selected golf equipment sites and other PGA related Internet sites. As a final example, entering sub-category 7600 passes control to NBA sub-category page 900C-3, which includes a channel number table 910C-3 listing selected NBA team sites and other NBA related Internet sites. As discussed above, selection of a sub-category channel number links the user terminal to the Internet site address stored in channel table 219A stored in flash memory 219 (see FIG. 3). By providing a series of computer pages in the manner indicated in FIG. 10, a convenient system is provided for navigating a channel-based network using a minimum amount of memory space.

In accordance with another aspect of the present invention, at least one computer page includes a group of logos that are provided to facilitate premium services to Internet sites willing to pay the network owner an associated fee. In particular, those Internet sites wishing to display their logo on, for example, main computer page 900A (FIG. 9(A)) pay an associated fee to the network owner, who then updates the file for main page 900A according to known techniques, and downloads the computer page file to the user terminals of the channel-based network. Accordingly, the network owner increases revenues by selling additional advertisement space to those Internet sites willing to pay the associated fee, and the Internet sites paying this fee benefit from increased exposure of their logo on the selected computer page.

As indicated in FIG. 10, each computer page includes a different group of logos. For example, sub-category page 900C-1 includes a logo group 920C-1 that are directed to NHL-related sites, and sub-category page 900C-2 includes a logo group 920C-2 that are directed to PGA-related sites. However, in another embodiment the logos can be the same for every computer page, thereby minimizing the amount of memory required to store the logos.

According to a second embodiment, a process is provided for establishing a channel-based network 100 by assigning (allocating) logo spaces to associated Internet sites. Briefly described with reference to FIG. 4, network server 110 receives a request for a logo space assignment from an Internet site (e.g., XYZ NEWS), for example, in response to an advertisement broadcast by the network proprietor (i.e., the owner of network server 110). In response to the request, a logo space (and channel number, if not already assigned) is assigned to the Internet site on a selected computer page (e.g., main computer page 900A). Next, the network owner updates the computer page information stored in server 110 to identify the assigned logo space and the associated logo. During subsequent user terminal download operations, the updated computer page information (including the image file and address for the Internet site) is stored in flash memory 219 of user terminals 130-A through 130-D. The computer page is then displayed, for example, on a television 132 connected to set-top box 131, when selected by a user. The user then reads the logo and selectively accesses the Internet site by either entering the associated channel number, or using an input device (e.g., joystick 206; shown in FIG. 4) to position a cursor and select (i.e., "click on") the logo. In response, set-top box 131 transmits the Internet address associated with the selected logo onto the Internet, thereby establishing a connection between the Internet site and set-top box 131 without requiring the user to type in the Internet address (e.g., URL) using a QWERTY keyboard.

Figure 11:
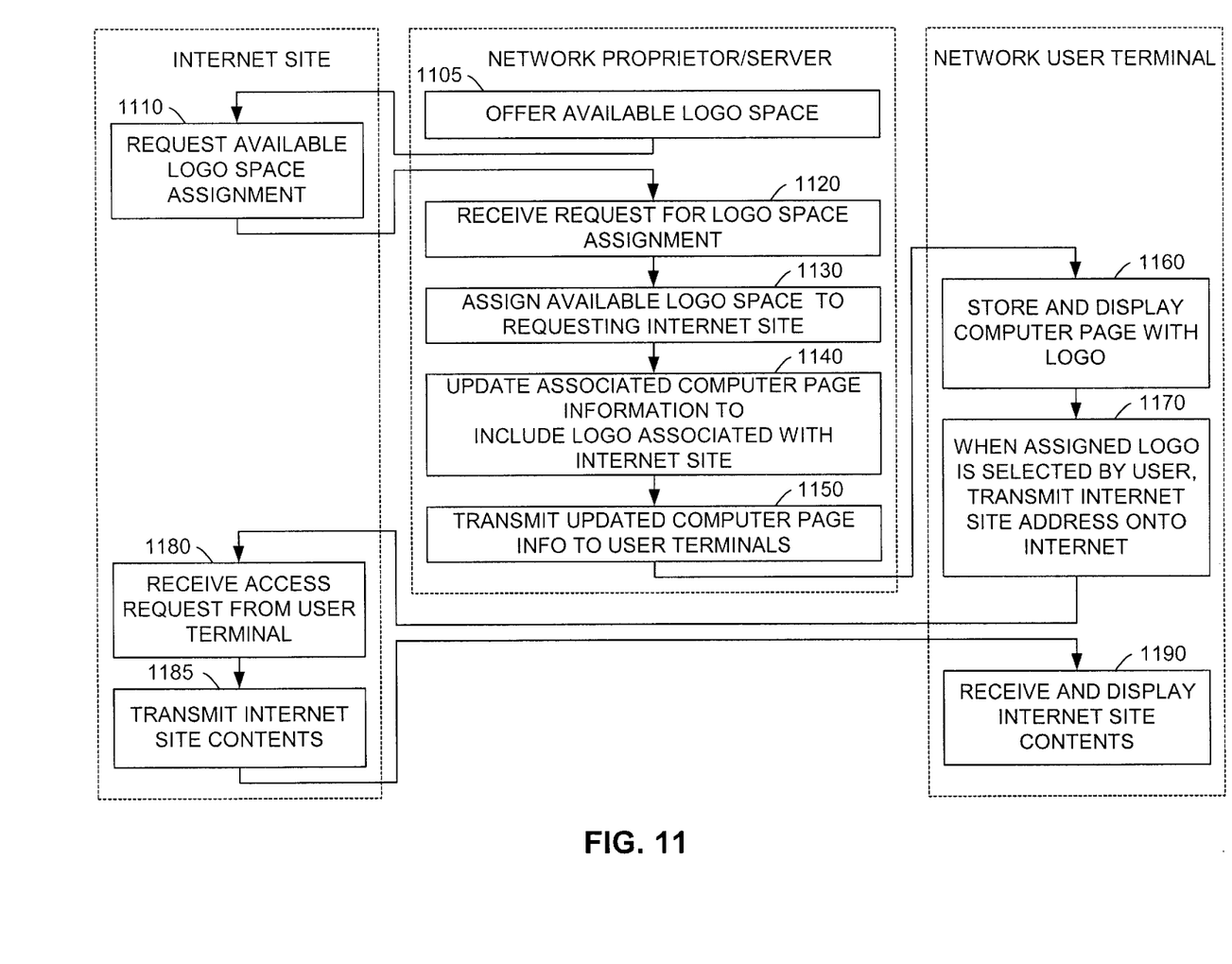
FIG. 11 is a flow diagram showing method for assigning logo spaces according to the second embodiment.

FIG. 11 is a flow diagram showing a process of establishing channel-based network 100 according to the second embodiment. The description below presumes a channel number is already assigned to the requesting Internet site according to methods similar to those described above. Referring to the center column of FIG. 11, the network proprietor offers an available logo space to an Internet site (step 1105). In response, as shown in the leftmost column of FIG. 11, the Internet site requests the available logo space (step 1110). Returning to the center column of FIG. 11, upon receiving the request (step 1120), the network proprietor assigns the available logo space to the requesting Internet site (step 1130), and then updates an associated computer page description stored in server 110 (see FIG. 4) to include a logo file (e.g., a logo for the requesting Internet site), and other attributes associated with the assigned logo (e.g., pop-up billboards, based on the overLIB technology developed by Eric Bosrup, that display additional advertisement information or Hyperlinks) (step 1140). In one embodiment, the logo message also displays the channel number for the requesting Internet site. The process of updating the associated computer page is performed, for example, using input terminal 401 (see FIG. 4). Subsequently, the updated computer page description, which includes the newly assigned logo space information, is transmitted over the Internet to one or more user terminals (step 1150). Referring to the rightmost column of FIG. 11, upon downloading the updated computer page information, the user terminal stores the computer page information in flash memory 219 (shown in FIG. 4), and displays the computer page and the assigned logo in the manner described above (step 1160). Subsequent selection (e.g., by positioning a cursor and "clicking" an appropriate mouse button) of the assigned logo by the user terminal's owner causes the user terminal to execute the associated link to transmit the Internet address associated with the logo onto the Internet (step 1170). Shifting to the leftmost column of FIG. 11, upon being contacted by the user terminal (step 1180), the Internet site transmits content data to the user terminal (step 11855) using known techniques. Finally, as indicated in the rightmost column of FIG. 11, the content data transmitted from the Internet site is displayed by the user terminal (step 1190) using known techniques.

Logo assignment and fee calculation is performed in a manner similar to that described above with reference to the channel numbers. Note that an Internet site may request that a logo only be displayed on one computer page (e.g., the main computer page, or the computer page associated with the Internet sites channel number), or on multiple pages. Premium fees may also be charged for specific logo space positions (e.g., top left corner of the logo array). Fee calculation may therefore be determined in accordance to the number of computer pages including an Internet site's logo information, and in accordance with the specified position.

As suggested above, in addition to the specific embodiments disclosed herein, other modifications to the methods for establishing a channel-based network are also possible. Thus, the invention is limited only by the following claims.

What is claimed is:

1. A method for operating a channel-based internet access network including a plurality of user terminals that are connected to the Internet, the method comprising the steps of:

receiving a request for a channel number assignment from an Internet site having an Internet address;

assigning a selected channel number to the requesting Internet site;

updating a master channel table such that the master channel table stores the Internet address of the requesting Internet site in a field associated with the selected channel number; and transmitting at least a portion of the updated master channel table to the plurality of user terminals such that each user terminal stores the Internet address in a field associated with the selected channel number.

2. The method according to claim 1, further comprising the step of offering to sell available channel numbers to one or more Internet sites.

3. The method according to claim 2, wherein the step of offering includes offering non-preferred channel numbers at a first price, and offering preferred channel numbers at a second price, the second price being higher than the first price.

4. The method according to claim 1, wherein the step of assigning the selected channel number comprises determining whether the requested channel number is a specified channel number or a non-specified channel number.

5. The method according to claim 4, wherein, when the requested channel number is a specified channel number, the step of assigning comprises:

verifying the availability of the requested preferred channel number;

calculating a fee for using the specified channel number; and transmitting to the requesting Internet site the calculated fee and a confirmation message that the requested specific channel number is assigned to the requesting Internet site.

6. The method according to claim 5, wherein the step of calculating the fee comprises adding a base fee component and a premium fee component, the base fee component being proportional to a number of user terminals connected to the network, and the premium fee component being determined by a pre-defined value assigned to the specific channel number requested by the Internet site.

7. The method according to claim 4, wherein, when the requested channel number is a non-specified channel number, the step of assigning comprises:

identifying an Internet site service type from a group of Internet site service types;

selecting an available channel number from a group of channel numbers associated with the identified Internet service type;

calculating a fee for using the non-specified channel number; and transmitting to the requesting Internet site the calculated fee and a confirmation message identifying the channel number assigned to the requesting Internet site.

8. The method according to claim 7, wherein the step of calculating the fee comprises a base fee component that is determined by a number of user terminals connected to the network.

9. The method according to claim 7, wherein each service type of the group of predefined service types is associated with a plurality of sequential channel numbers.

10. A method for operating a channel-based internet access network including a plurality of user terminals, each user terminal having a flash memory and being connected to the Internet, the method comprising the steps of:

receiving a request for a logo space assignment from an Internet site having an Internet address;

assigning a selected logo space to the requesting Internet site;

updating a computer page description stored in a server such that predefined logo space of the computer page includes an identification image and a link to the requesting Internet site; and transmitting the updated computer page to the plurality of user terminals such that each user terminal stores the computer page in its flash memory.

* * * * *